United States Patent
Tian et al.

(10) Patent No.: US 10,547,248 B2
(45) Date of Patent: Jan. 28, 2020

(54) RECTIFIER CIRCUIT AND DIMMER CIRCUIT

(71) Applicant: Sengled Co., Ltd., Shanghai (CN)

(72) Inventors: Zhibin Tian, Shanghai (CN); Junshan Lou, Shanghai (CN); Jinxiang Shen, Shanghai (CN)

(73) Assignee: SENGLED CO., LTD., Shanghai (CN)

( * ) Notice: Subject to any disclaimer, the term of this patent is extended or adjusted under 35 U.S.C. 154(b) by 0 days.

(21) Appl. No.: 16/331,795

(22) PCT Filed: Sep. 12, 2017

(86) PCT No.: PCT/CN2017/101399
§ 371 (c)(1),
(2) Date: Mar. 8, 2019

(87) PCT Pub. No.: WO2018/046012
PCT Pub. Date: Mar. 15, 2018

(65) Prior Publication Data
US 2019/0363641 A1 Nov. 28, 2019

(30) Foreign Application Priority Data

Sep. 12, 2016 (CN) .......................... 2016 1 0818959

(51) Int. Cl.
*H02M 7/217* (2006.01)
*H05B 37/02* (2006.01)

(52) U.S. Cl.
CPC ............ *H02M 7/217* (2013.01); *H05B 37/02* (2013.01)

(58) Field of Classification Search
CPC ............ H02M 7/02; H02M 7/04; H02M 7/12; H02M 7/20; H02M 7/15; H02M 7/153;
(Continued)

(56) References Cited

U.S. PATENT DOCUMENTS 8,928,235 B2 1/2015 Angeles
9,456,475 B2 * 9/2016 Cao .................... H05B 33/0887
(Continued)

FOREIGN PATENT DOCUMENTS

CN 201657406 U 11/2010
CN 103052200 A 4/2013
(Continued)

OTHER PUBLICATIONS

The World Intellectual Property Organization (WIPO) International Search Report and Written Opinion for PCT/CN2017/101399 dated Dec. 20, 2017 7 Pages.

*Primary Examiner* — Adolf D Berhane
(74) *Attorney, Agent, or Firm* — Anova Law Group, PLLC

(57) ABSTRACT

A rectifier circuit and a dimmer circuit are provided, comprising: an isolating driver circuit, a switching control circuit, a before-bridge damper circuit, and a rectifier bridge. The isolating driver circuit is connected to the before-bridge damper circuit via the switching control circuit, two ends of the switching control circuit are connected to two input ends of the rectifier bridge, respectively, and two ends of the before-bridge damper circuit are connected to the two input ends of the rectifier bridge, respectively. In the disclosed rectifier circuit and damper circuit, the isolating driver circuit receives the after-bridge control signal after the rectifier bridge, the switching control circuit controls connection or disconnection of the before-bridge damper circuit to the rectifier circuit based on the after-bridge control signal. Accordingly, the before-bridge damper circuit may be adjusted based on the after-bridge control signal, and flexibility in controlling and adjusting the rectifier bridge circuit is improved.

19 Claims, 8 Drawing Sheets

(58) Field of Classification Search
CPC .... H02M 7/155; H02M 7/1555; H02M 7/162; H02M 7/163; H02M 7/21; H02M 7/213; H02M 7/217; H02M 7/219; H02M 7/23; H05B 37/02; H05B 33/0815; H05B 33/0887; H05B 33/089; H05B 33/0842
See application file for complete search history.

(56) References Cited

U.S. PATENT DOCUMENTS

| | | | |
|---|---|---|---|
| 10,257,908 B2* | 4/2019 | Wang | H05B 33/089 |
| 2014/0300289 A1* | 10/2014 | Zhu | H05B 33/0815 |
| | | | 315/206 |
| 2016/0218626 A1* | 7/2016 | Del Carmen, Jr. | H05B 33/0815 |
| 2017/0025962 A1* | 1/2017 | Davidson | H02M 1/42 |
| 2017/0118811 A1* | 4/2017 | Dadashnialehi | H05B 33/0815 |
| 2019/0261478 A1* | 8/2019 | Kober | H05B 33/0812 |

FOREIGN PATENT DOCUMENTS

| | | |
|---|---|---|
| CN | 103687154 A | 3/2014 |
| CN | 105873277 A | 8/2016 |
| CN | 106329965 A | 1/2017 |
| CN | 206274640 U | 6/2017 |

* cited by examiner

RECTIFIER CIRCUIT AND DIMMER CIRCUIT

CROSS-REFERENCES TO RELATED APPLICATIONS

This application is a national phase entry under 35 U.S.C. § 371 of International Application No. PCT/CN2017/101399, filed on Sep. 12, 2017, claims the priority of Chinese Patent Application No. 201610818959.5 filed on Sep. 12, 2016, the entire contents of both of which are incorporated herein by reference.

FIELD OF THE DISCLOSURE

The present disclosure relates to the technology of rectifier circuit and, more particularly, relates to a rectifier circuit and a dimmer circuit.

BACKGROUND

The rectifier circuit is a circuit that converts alternating current (AC) electrical energy to direct current (DC) electrical energy. The rectifier bridge is the most common circuit that utilizes the property of one-way conduction of the diode to perform rectification, and is often applied to convert AC to DC. Under certain occasions, the circuit that is before the rectifier bridge (before-bridge circuit) needs to be controlled. For example, in the implementation of a dimmer circuit, the connection and disconnection of the damper circuit needs to be controlled flexibly based on the type of the dimmer. When a leading edge dimmer is connected before the rectifier bridge, a damper circuit needs to be connected before the rectifier bridge to yield satisfying dimming effects. When a trailing edge dimmer is connected before the rectifier bridge, the damper circuit before the bridge needs to be disconnected. Otherwise, operations of the dimmer may become abnormal under certain conditions (e.g., the load reduces), resulting in the failure of the circuit, which damages the device.

Commonly, since the AC circuit before the rectifier bridge and the DC circuit after the rectifier bridge have different reference voltages, different methods are used to control and adjust the AC circuit before the rectifier bridge and the DC circuit after the rectifier bridge, respectively. Therefore, the circuit after the rectifier bridge cannot be applied to control and adjust the circuit before the rectifier bridge.

BRIEF SUMMARY OF THE DISCLOSURE

The present disclosure provides a rectifier circuit and a dimmer circuit, thereby improving the flexibility of controlling and adjusting the rectifier bridge circuit.

The present disclosure provides a rectifier circuit, comprising: an isolating driver circuit, a switching control circuit, a before-bridge damper circuit, and a rectifier bridge; where the isolating driver circuit is connected to the before-bridge damper circuit via the switching control circuit, two ends of the switching control circuit are connected to two input ends of the rectifier bridge, respectively, and two ends of the before-bridge damper circuit are connected to two input ends of the rectifier bridge, respectively; and the isolating driver circuit is configured to receive an after-bridge control signal after the rectifier bridge, and the switching control circuit is configured to control the before-bridge damper circuit to disconnect or connect with the rectifier circuit based on the after-bridge control signal.

In one embodiment of the present disclosure, the switching control circuit comprises: a first driver circuit and a switching tube. The first driver circuit is configured to control the switching tube based on the after-bridge control signal, and the switching tube is configured to control the before-bridge damper circuit to disconnect or connect with the rectifier circuit.

In one embodiment of the present disclosure, the before-bridge damper circuit is a first order resistance-capacitance (RC) series circuit; and the before-bridge damper circuit is connected in series with the switching tube.

In one embodiment of the present disclosure, the isolating driver circuit comprises: a second driver circuit and an isolator. The second driver circuit is configured to receive the after-bridge control signal after the rectifier bridge, and the isolator is configured to realize electric isolation between the isolating driver circuit and the switching control circuit; and an input end of the rectifier bridge is connected to a live wire and a neutral wire carrying the alternating current.

In one embodiment of the present disclosure, the second driver circuit comprises: a first resistor and a first switch; and the isolator comprises: a first photoelectric coupler. A primary input end of the first photoelectric coupler is connected to ground via the first switch, and a secondary output end and a secondary input end of the first photoelectric coupler are both connected to the switching control circuit.

In one embodiment of the present disclosure, the first driver circuit comprises: a first diode, a second resistor, a first capacitor, a first Zener diode, and a third resistor; and the switching tube comprises: a first field effect transistor. A positive electrode of the first diode is connected to the live wire, a negative electrode of the first diode is connected to an end of the second resistor, another end of the second resistor is connected to an end of the first capacitor, a negative end of the first Zener diode, and the secondary input end of the first photoelectric coupler, respectively. Another end of the first capacitor is connected to a positive end of the first Zener diode, an end of the third resistor, and a source electrode of the first field effect transistor. Another end of the third resistor is connected to the secondary output end of the first photoelectric coupler and a gate electrode of the first field effect transistor, and a drain electrode and a source electrode of the first field effect transistor are connected to the before-bridge damper circuit.

In one embodiment of the present disclosure, the before-bridge damper circuit comprises: a fourth resistor and a second capacitor.

In one embodiment of the present disclosure, the drain electrode of the first field effect transistor is connected to the live wire via the fourth resistor, and the source electrode of the first field effect transistor is connected to the neutral wire via the second capacitor.

In one embodiment of the present disclosure, an end of the second capacitor is connected to the live wire via the fourth resistor, another end of the second capacitor is connected to the drain electrode of the first field effect transistor, and the source electrode of the first field effect transistor is connected to the neutral wire.

In one embodiment of the present disclosure, the drain electrode of the first field effect transistor is connected to the live wire via the second capacitor, and the source electrode of the first field effect transistor is connected to the neutral wire via the fourth resistor.

In one embodiment of the present disclosure, the first driver circuit comprises: a second diode, a fifth resistor, a third capacitor, a second Zener diode, and a sixth resistor.

The switching tube comprises: a second field effect transistor. A positive electrode of the second diode is connected to the live wire, and a negative electrode of the second diode is connected to an end of the fifth resistor. Another end of the fifth resistor is connected to the isolating driver circuit, an end of the third capacitor, a negative electrode of the second Zener diode, an end of the sixth resistor, and a gate electrode of the second field effect transistor, respectively. The isolating driver circuit is connected to another end of the third capacitor, a positive electrode of the second Zener diode, another end of the sixth resistor, and a source electrode of the second field effect transistor, respectively. The drain electrode and the source electrode of the second field effect transistor are connected to the before-bridge damper circuit.

In one embodiment of the present disclosure, the before-bridge damper circuit includes: a seventh resistor and a fourth capacitor.

In one embodiment of the present disclosure, the drain electrode of the second field effect transistor is connected to the live wire via the seventh resistor, and the source electrode of the second field effect transistor is connected to the neutral wire via the fourth capacitor.

In one embodiment of the present disclosure, an end of the fourth capacitor is connected to the live wire via the seventh resistor, another end of the fourth capacitor is connected to the drain electrode of the second filed effect tube, and the source electrode of the second field effect transistor is connected to the neutral wire.

In one embodiment of the present disclosure, the drain electrode of the second field effect transistor is connected to the live wire via the fourth capacitor, and the source electrode of the second field effect transistor is connected to the neutral wire via the seventh resistor.

In one embodiment of the present disclosure, the isolating driver circuit comprises: an eighth resistor and a second switch; and the isolator comprises a relay. An output end of a primary side of the relay is connected to ground via the second switch, and an input end of the primary side of the relay is connected to a power source via the eighth resistor; and an input end and an output end of a secondary side of the relay are connected to two sides of the third capacitor, respectively.

In one embodiment of the present disclosure, the isolating driver circuit comprises: a fifth capacitor, a transformer, a sixth capacitor, a third diode, a ninth resistor, a seventh capacitor, a tenth resistor, and a third field effect transistor. An input end of a primary coil of the transformer receives a signal via the fifth capacitor; an output end of the primary coil of the transformer is connected to ground. An input end of a secondary coil of the transformer is connected to a negative electrode of the third diode and an end of the ninth resistor via the sixth capacitor, and another end of the ninth resistor is connected to an end of the seventh capacitor, an end of the tenth resistor, and a gate electrode of the third field effect transistor. An output end of the secondary coil of the transformer is connected to a positive electrode of the third diode, another end of the seventh capacitor, another end of the tenth resistor, and the source electrode of the third field effect transistor. The drain electrode and the source electrode of the third field effect transistor are connected to the switching control circuit.

The switching control circuit comprises: a fourth diode, an eleventh resistor, an eighth capacitor, a third Zener diode, a twelfth resistor, and a fourth field effect transistor. A positive electrode of the fourth diode is connected to the live wire, and a negative electrode of the fourth diode is connected to an end of the eleventh resistor. Another end of the eleventh resistor is respectively connected to the drain electrode of the third field effect transistor, an end of the eighth capacitor, a negative electrode of the third Zener diode, an end of the twelfth resistor, and a gate electrode of the fourth field effect transistor. The source electrode of the third field effect transistor is respectively connected to another end of the eighth capacitor, a positive electrode of the third Zener diode, another end of the twelfth resistor, and a source electrode of the fourth field effect transistor. A drain electrode and the source electrode of the fourth field effect transistor are connected to the before-bridge damper circuit.

In one embodiment of the present disclosure, the first driver circuit comprises: a fifth diode, a thirteenth resistor, a ninth capacitor, a fourth Zener diode, a fourteenth resistor, and a fifth field effect transistor; the switching tube comprises: a sixth field effect transistor; and the before-bridge damper circuit comprises: a fifteenth resistor and a tenth capacitor. A positive electrode of the fifth diode is connected to the live wire, a negative electrode of the fifth diode is connected to an end of the thirteenth resistor, another end of the thirteenth resistor is respectively connected to the secondary input end of the first photoelectric coupler, an end of the ninth capacitor, a negative electrode of the fourth Zener diode, an end of the fourteenth resistor, a gate electrode of the fifth field effect transistor, and a gate electrode of the sixth field effect transistor. The secondary output end of the first photoelectric coupler is respectively connected to another end of the ninth capacitor, a positive electrode of the fourth Zener diode, another end of the fourteenth resistor, a source electrode of the fifth field effect transistor, and a source electrode of the sixth field effect transistor. The source electrode of the fifth field effect transistor is connected to a source electrode of the sixth field effect transistor, a drain electrode of the fifth field effect transistor is connected to the live wire via the fifteenth resistor, and the drain electrode of the sixth field effect transistor is connected to the neutral wire via the tenth capacitor.

The present disclosure provides a dimmer circuit, comprising: a control circuit, a dimmer, and a rectifier circuit described in any aforementioned embodiments, where the dimmer is connected in series with an input-end loop of the rectifier bridge. The control circuit is connected after the rectifier bridge, and is configured to provide an after-bridge control signal to the rectifier circuit.

In the disclosed rectifier circuit and dimmer circuit, the isolating driver circuit is used to receive the after-bridge control signal that is after the rectifier bridge, and the switching control circuit is used to control the before-bridge damper circuit to disconnect or connect with the rectifier circuit based on the after-bridge control signal. Accordingly, the before-bridge damper circuit before the rectifier bridge may be adjusted based on the after-bridge control signal after the rectifier bridge, thereby improving the flexibility of control and adjustment of the rectifier bridge circuit.

BRIEF DESCRIPTION OF THE DRAWINGS

To more clearly describe technical solutions in embodiments of the present disclosure or the prior art, the accompanying drawings needed in describing the disclosed embodiments or the prior art are briefly introduced hereinafter. Obviously, the accompanying drawings in the following descriptions are merely some embodiments of the present disclosure. Those skilled in the art may derive other drawings based on the accompanying drawings without creative effort.

DETAILED DESCRIPTION

Figure 1:
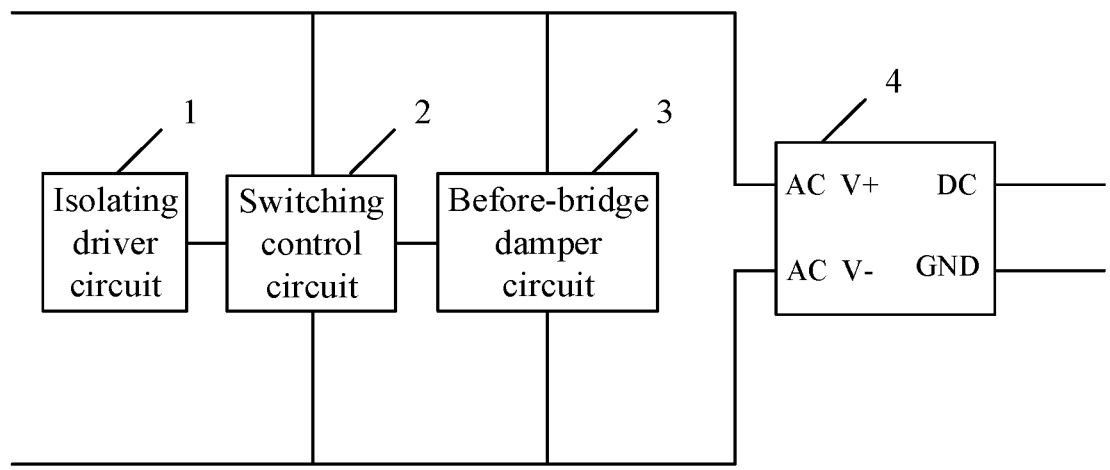
FIG. 1 illustrates a structural schematic view of a rectifier circuit consistent with Embodiment 1 of the present disclosure.

Technical solutions in embodiments of the present disclosure will be described in a clear and complete manner hereinafter with reference to the accompanying drawings in embodiments of the present disclosure. Obviously, the embodiments described herein are merely a part of, but not entire embodiments of the present disclosure. Based on the embodiments of the present disclosure, other embodiments obtainable by those ordinarily skilled in the art without creative effort shall all fall within the protection scope of the present disclosure.

The terms such as "first", "second", "third", and "fourth" (if exist) in the specification, claims and the aforementioned drawings of the present disclosure are used to differentiate similar objects, but do not necessarily describe specific orders or sequences. It should be understood that the numerals used in such way may be exchanged under appropriate conditions, such that embodiments of the present disclosure may be implemented in orders other than that illustrated in the drawings or descriptions. In addition, terms of "including" and "comprising" and any derivatives are intended to cover non-exclusive inclusions, for example, the process, method, system, product or device comprising a series of steps or units does not necessarily need to be limited to the clearly listed steps or units, but may include steps or units that are not clearly listed, or other steps or units intrinsic to such process, method, product, or device.

Technical solutions of the present disclosure are illustrated more fully hereinafter with reference to specific embodiments. The following specific embodiments may be combined with each other, and the same or similar concepts or processes may not be described repeatedly in certain embodiments.

FIG. 1 illustrates a structural schematic view of a rectifier circuit consistent with Embodiment 1 of the present disclosure. As shown in FIG. 1, the rectifier circuit in the embodiment comprises: an isolating driver circuit 1, a switching control circuit 2, a before-bridge damper circuit 3, and a rectifier bridge 4. The isolating driver circuit 1 is connected to the before-bridge damper circuit 3 via the switching control circuit 2, two ends of the switching control circuit 3 are connected to two input ends of the rectifier bridge 4, respectively, and two ends of the before-bridge damper circuit 3 are connected to two input ends of the rectifier bridge 4, respectively. Further, the isolating driver circuit 1 is configured to receive an after-bridge control signal after the rectifier bridge 4, and the switching control circuit 2 is configured to control the before-bridge damper circuit 3 to disconnect or connect with the rectifier circuit based on the after-bridge control signal.

The present disclosure provides a rectifier circuit and a dimmer circuit, comprising: an isolating driver circuit, a switching control circuit, a before-bridge damper circuit, and a rectifier bridge. The isolating driver circuit is connected to the before-bridge damper circuit via the switching control circuit, two ends of the switching control circuit are connected to two input ends of the rectifier bridge, respectively, and two ends of the before-bridge damper circuit are connected to two input ends of the rectifier bridge, respectively. In the disclosed rectifier circuit and damper circuit, the isolating driver circuit receives the after-bridge control signal that is after the rectifier bridge, and the switching control circuit controls the before-bridge damper circuit to disconnect or connect with the rectifier circuit based on the after-bridge control signal. Accordingly, the before-bridge damper circuit before the rectifier bridge can be adjusted based on the after-bridge control signal after the rectifier bridge, thereby improving the flexibility of control and adjustment of the rectifier bridge circuit.

Optionally, the isolating driver circuit 1 comprises a second driver circuit and an isolator. The second driver circuit is configured to receive the after-bridge control signal after the rectifier bridge, and the isolator is configured to realize electrical isolation between the isolating driver circuit 1 and the switching control circuit 2. More specifically, one end of the second driver circuit accesses an alternating current, another end of the second driver circuit 1 provides a driving voltage for the output of the isolator, and an output end of the isolator is connected to the switching control circuit 2. Input ends of the rectifier bridge 4 are coupled to a live wire and a neutral wire that carry the alternating current.

Optionally, the isolator is one of a photoelectric coupler, a transformer and a relay.

Optionally, the switching control circuit 2 includes a first driver circuit and a switching tube. The first driver circuit is configured to control the switching tube based on the after-bridge control signal, and the switching tube is configured to control the before-bridge damper circuit 3 to disconnect or connect with the rectifier circuit.

Optionally, the before-bridge damper circuit 3 is a branch circuit which is controlled in connection or disconnection.

Optionally, the before-bridge damper circuit 3 is a first order resistance-capacitance (RC) series circuit. The before-bridge damper circuit 3 comprises a resistor and a capacitor connected in series. The before-bridge damper circuit 3 is connected in series with the switching tube of the switching control circuit 2.

Optionally, the after-bridge control signal is a high or low voltage level signal, or a pulse width modulation (PWM) signal.

Figure 2:
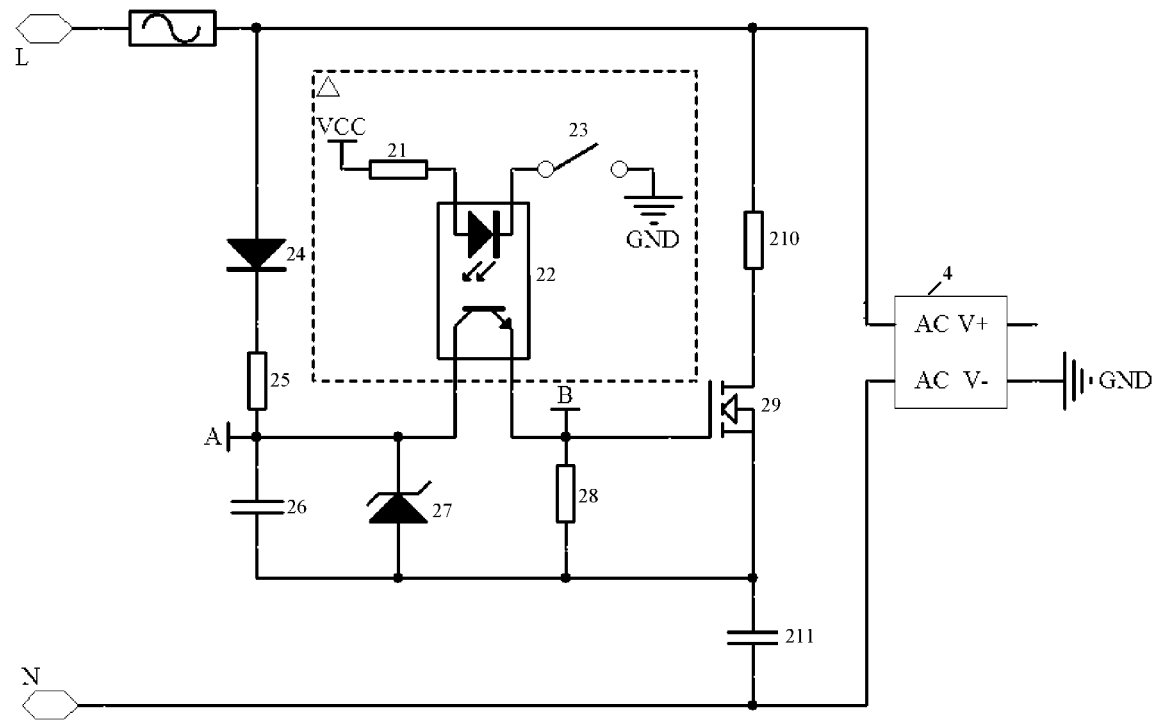
FIG. 2 illustrates a circuit structural schematic view of a rectifier circuit consistent with Embodiment 2.

FIG. 2 illustrates a circuit structural schematic view of a rectifier circuit consistent with Embodiment 2. As shown in FIG. 2, in the disclosed rectifier circuit, input ends of the rectifier bridge 4 are connected to a live wire and a neutral wire carrying the alternating current, where L denotes the live wire and N denotes the neutral wire. The live wire is connected to an input end of the rectifier bridge 4 via a fuse. The second driver circuit comprises: a first resistor 21 and a first switch 23. The isolator comprises: a first photoelectric coupler 22. The on-and-off of the first switch 23 is controlled by the after-bridge control signal. The first switch 23 may be a metal oxide semiconductor (MOS) transistor, and the on-and-off of the MOS transistor is controlled by the after-bridge control signal. The primary input end of the first photoelectric coupler 22 is connected to a power source via the first resistor 21, the primary output end of the first photoelectric coupler 22 is connected to ground via the first switch 23, and the secondary output end and the secondary input end of the first photoelectric coupler 22 are both connected to the switching control circuit 2.

The first driver circuit comprises: a first diode 24, a second resistor 25, a first capacitor 26, a first Zener diode 27, and a third resistor 28. The switching tube comprises: a first field effect transistor 29.

In one embodiment, the first field effect transistor 29 is an enhanced N-channel metal oxide semiconductor (N-MOS) field effect transistor.

A positive electrode of the first diode 24 is connected to the live wire, a negative electrode of the first diode 24 is connected to an end of the second resistor 25, and another end of the second resistor 25 is connected to an end of the first capacitor 26, a negative end of the first Zener diode 27, and a secondary input end of the first photoelectric coupler 22, respectively. Another end of the first capacitor 26 is connected to the positive end of the first Zener diode 27, an end of the third resistor 28, and a source electrode of the first field effect transistor 29. Another end of the third resistor 28 is connected to the secondary output end of the first photoelectric coupler 22 and a gate electrode of the first field effect transistor 29, and a drain electrode and a source electrode of the first field effect transistor 29 are connected to the before-bridge damper circuit 3.

The before-bridge damper circuit 3 comprises: a fourth resistor 210 and a second capacitor 211.

The drain electrode of the first field effect transistor 29 is connected to the live wire via the fourth resistor 210, and the source electrode of the first field effect transistor 29 is connected to the neutral wire via the second capacitor 211.

Figure 3:
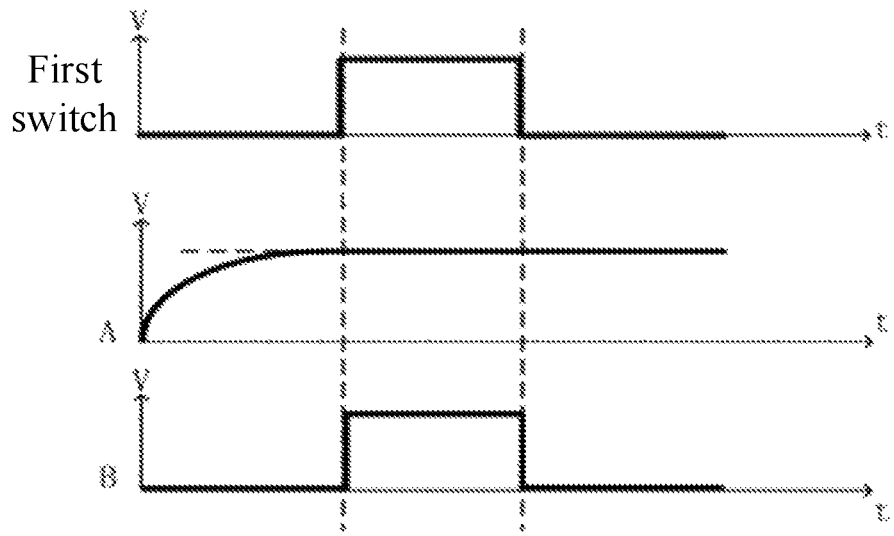
FIG. 3 illustrates a circuit principle diagram of a rectifier circuit consistent with Embodiment 2.

More specifically, FIG. 3 illustrates circuit voltage diagrams of a rectifier circuit consistent with Embodiment 2 of the present disclosure. As shown in FIG. 3, the first switch 23 is switched on or off based on the after-bridge control signal. When the first switch 23 is switched on, the primary input end and the primary output end of the first photoelectric coupler 22 are connected. Further, the secondary input end and the secondary output end of the first photoelectric coupler 22 are connected. Thus, a current exists between the point A and the point B, and the voltage level at point B increases. Furthermore, the first field effect transistor 29 is turned on, and the fourth resistor 210 and the second capacitor 211 are coupled to the circuit. When the first switch 23 is switched off, the primary input end and the primary output end of the first photoelectric coupler 22 are disconnected, and the secondary input end and the secondary output end of the first photoelectric coupler 22 are disconnected. Thus, no current exists between the point A and the point B, power supply at the point B is cut off, and the voltage level at the point B is lowered to be a low voltage level after the third resistor 28 discharges. Accordingly, the first field effect transistor 29 is turned off, such that the fourth resistor 210 is disconnected with the second capacitor 211.

Figure 4:
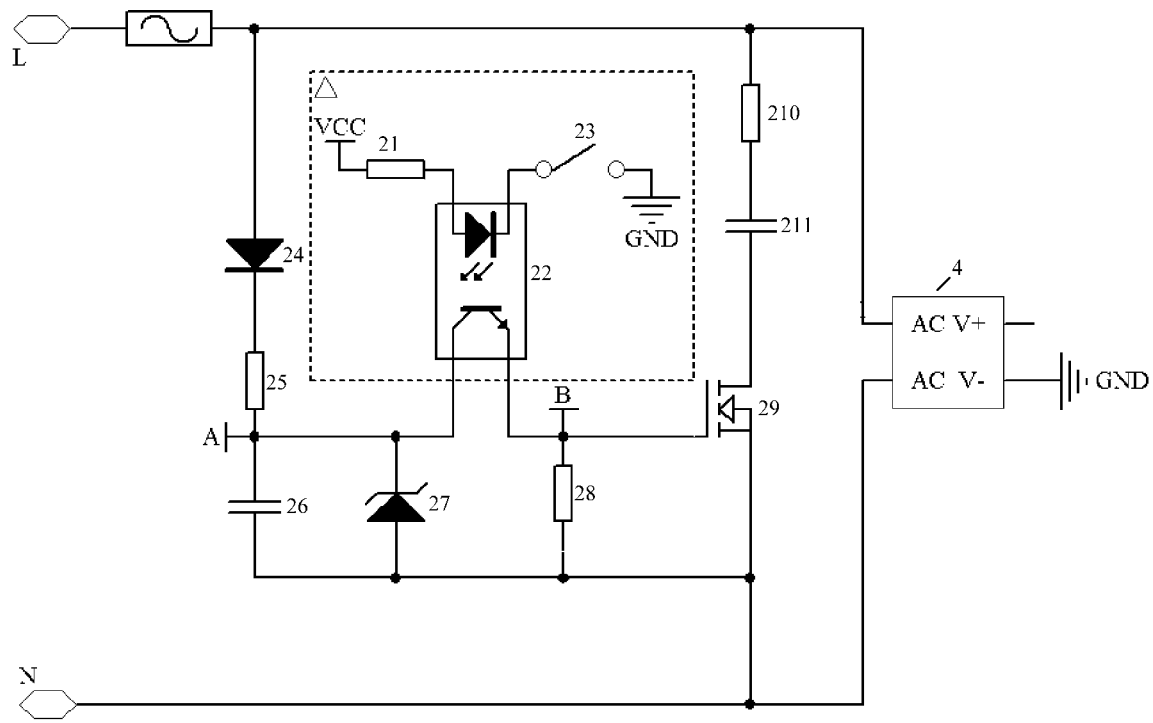
FIG. 4 illustrates a circuit structural schematic view of a rectifier circuit consistent with Embodiment 3.

FIG. 4 illustrates a circuit structural schematic view of a rectifier circuit consistent with Embodiment 3. As shown in FIG. 4, in the disclosed before-bridge damper circuit, an end of the second capacitor 211 is connected to the live wire via the fourth resistor 210, another end of the second capacitor 211 is connected to the drain electrode of the first field effect transistor 29, and the source electrode of the first field effect transistor 29 is connected to the neutral wire. The implementation principle of Embodiment 3 in FIG. 4 is similar to that in FIG. 2, and is not repeated herein.

Figure 5:
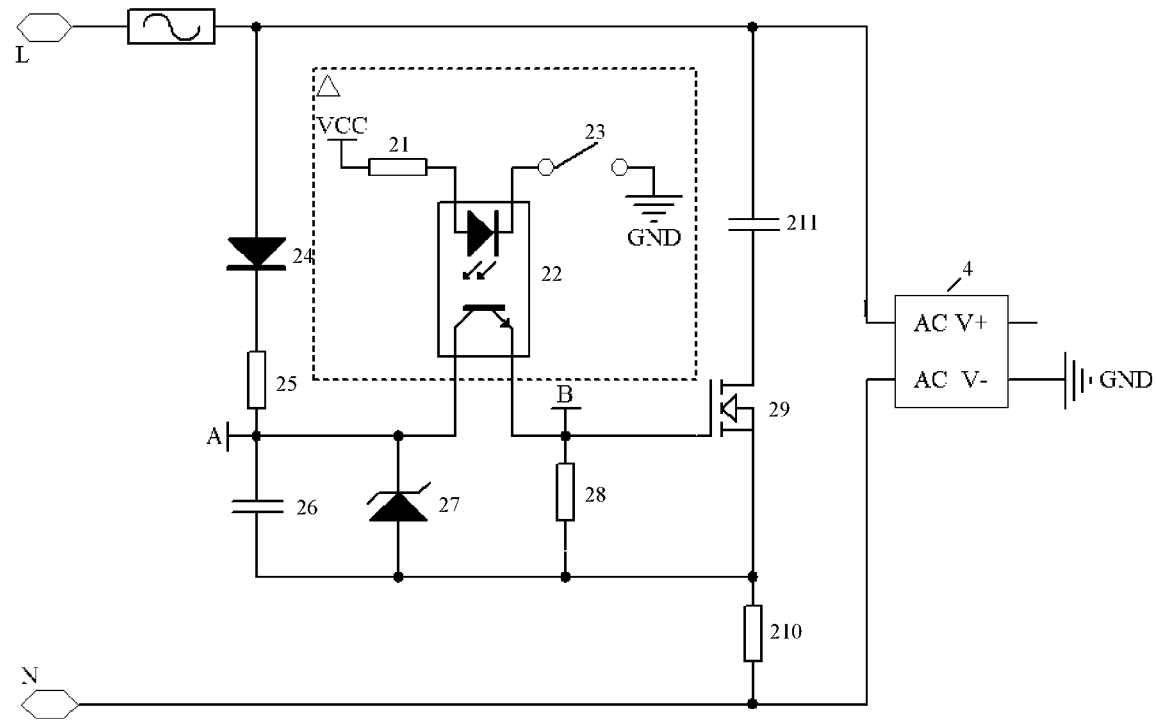
FIG. 5 illustrates a circuit structural schematic view of a rectifier circuit consistent with Embodiment 4.

FIG. 5 illustrates a structural schematic view of a rectifier circuit consistent with Embodiment 4. As shown in FIG. 5, in the disclosed before-bridge damper circuit, the drain electrode of the first field effect transistor 29 is connected to the live wire via the second capacitor 211, and the source electrode of the first field effect transistor 29 is connected to the neutral wire via the fourth resistor 210. The implementation principle of Embodiment 4 in FIG. 5 is similar to that in FIG. 2, and is not repeated herein.

Figure 6:
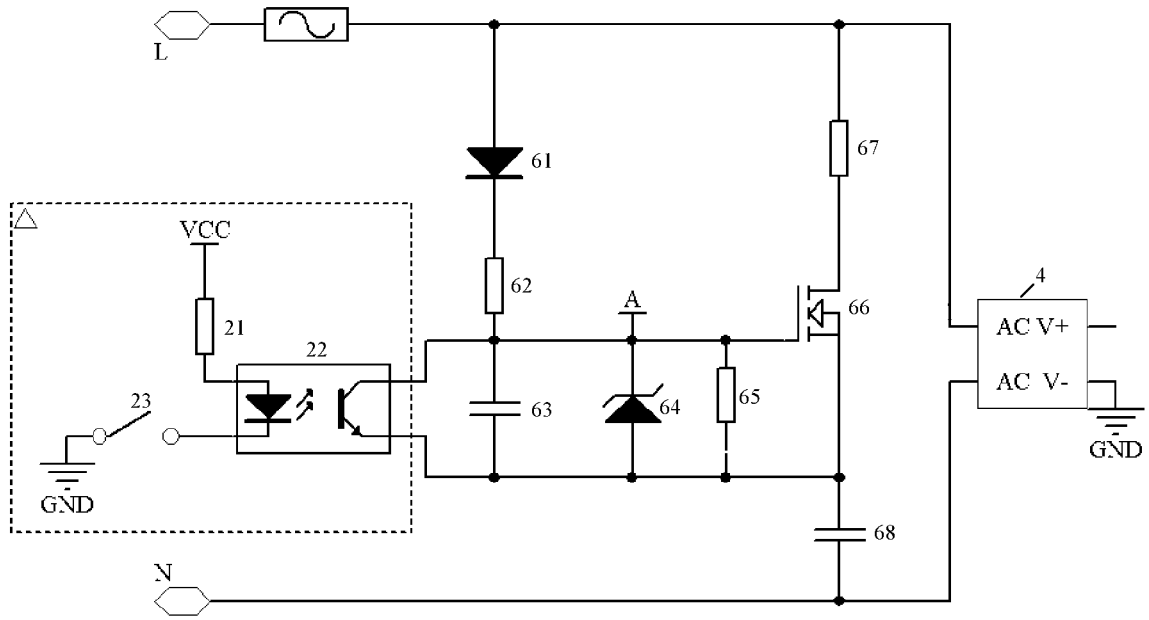
FIG. 6 illustrates a circuit structural schematic view of a rectifier circuit consistent with Embodiment 5.

FIG. 6 illustrates a circuit structural schematic view of a rectifier circuit consistent with Embodiment 5. As shown in FIG. 6, input ends of the rectifier bridge 4 are connected to the live wire and the neutral wire carrying the alternating current, where L denotes the live wire and N denotes the neutral wire. The live wire is connected to an input end of the rectifier bridge 4 via a fuse. In the disclosed rectifier circuit, the second driver circuit comprises: a first resistor 21 and a first switch 23. The isolator comprises: a first photoelectric coupler 22. The primary input end of the first photoelectric coupler 22 is connected to a power source via the first resistor 21, and the primary output end of the first photoelectric coupler 22 is connected to ground via the first switch 23. The secondary output end and the secondary input end of the first photoelectric coupler 22 are both connected to the switching control circuit 2.

The first driver circuit comprises: a second diode 61, a fifth resistor 62, a third capacitor 63, a second Zener diode 64, and a sixth resistor 65. The switching tube comprises: a second field effect transistor 66. A positive electrode of the second diode 61 is connected to the live wire, and a negative electrode of the second diode 61 is connected to an end of the fifth resistor 62. Another end of the fifth resistor 62 is connected to the secondary input end of the first photoelectric coupler 22, an end of the third capacitor 63, a negative electrode of the second Zener diode 64, an end of the sixth resistor 65, and a gate electrode of the second field effect transistor 66, respectively. The secondary output end of the first photoelectric coupler 22 is connected to another end of the third capacitor 63, a positive electrode of the second Zener diode 64, another end of the sixth resistor 65, and the source electrode of the second field effect transistor 66, respectively. The drain electrode and the source electrode of the second field effect transistor 66 are connected to the before-bridge damper circuit.

The before-bridge damper circuit includes: a seventh resistor 67 and a fourth capacitor 68.

The drain electrode of the second field effect transistor 66 is connected to the live wire via the seventh resistor 67, and the source electrode of the second field effect transistor 66 is connected to the neutral wire via the fourth capacitor 68.

Figure 7:
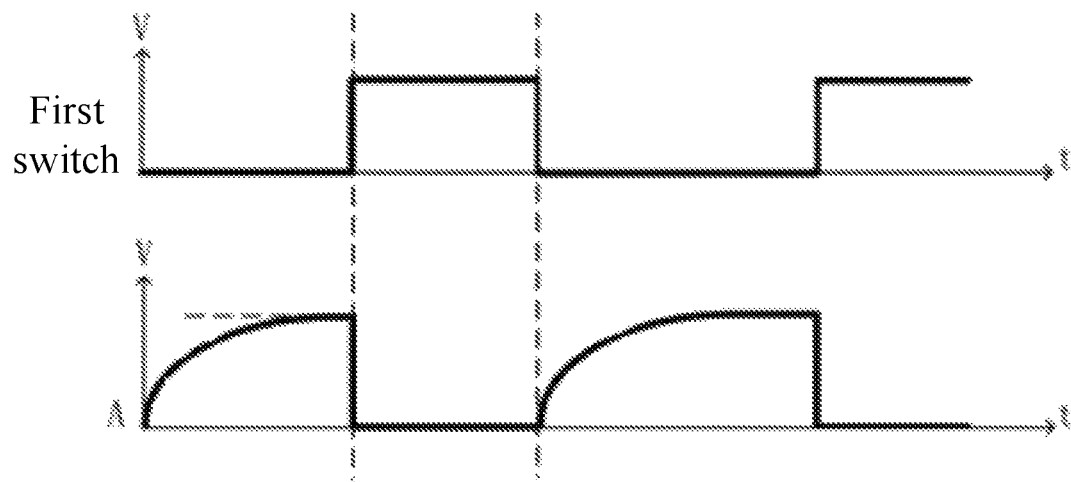
FIG. 7 illustrates a circuit principle diagram of a rectifier circuit consistent with Embodiment 5.

More specifically, FIG. 7 illustrates a circuit principle diagram of a rectifier circuit consistent with Embodiment 5. As shown in FIG. 7, the first switch 23 is switched on or off based on the after-bridge control signal. When the first switch 23 is switched on, the primary input end and the primary output end of the first photoelectric coupler 22 are connected, the secondary input end and the secondary output end of the first photoelectric coupler 22 are connected, and the voltage level at point A is lowered. Thus, the second field effect transistor 66 is turned off, and the seventh resistor 67 is disconnected to the fourth capacitor 68. When the first switch 23 is switched off, the primary input end and the primary output end of the first photoelectric coupler 22 are disconnected, and the secondary input end and the secondary output end of the first photoelectric coupler 22 are disconnected. Thus, after the voltage level at point A increases gradually to reach the voltage level of the second Zener tube 64, the second field effect transistor 66 is switched on, such that the seventh resistor 67 and the fourth capacitor 68 are coupled to the circuit.

Figure 8:
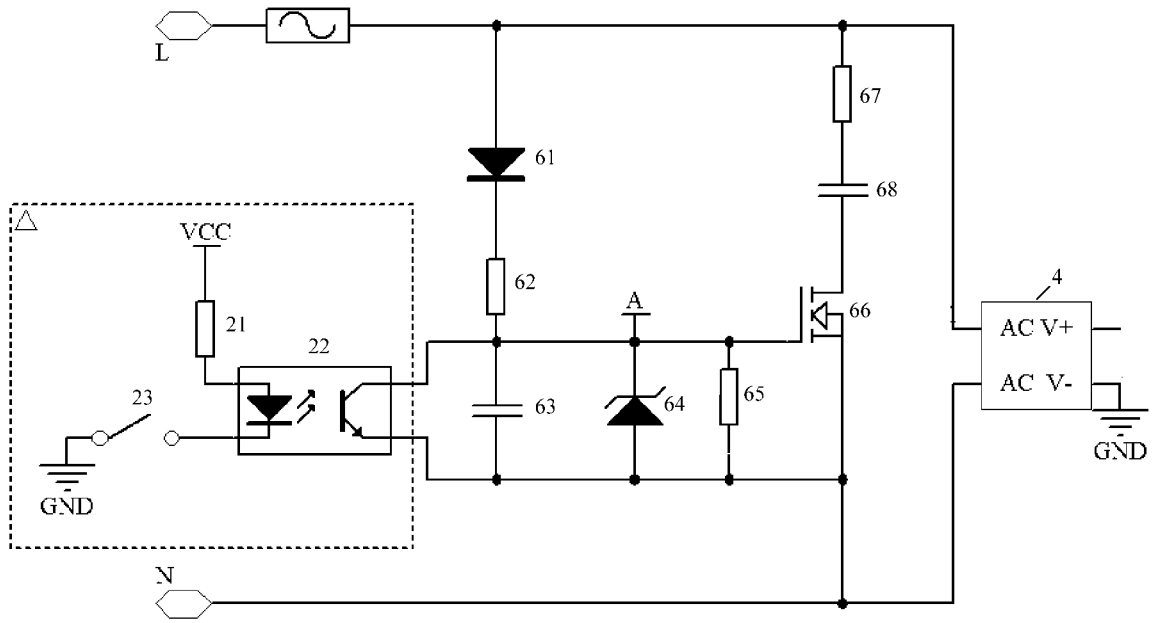
FIG. 8 illustrates a circuit structural schematic view of a rectifier circuit consistent with Embodiment 6.

FIG. 8 illustrates a structural schematic view of a rectifier circuit consistent with Embodiment 6. As shown in FIG. 8, in the disclosed before-bridge damper circuit, an end of the fourth capacitor 68 is connected to the live wire via the seventh resistor 67, another end of the fourth capacitor 68 is connected to the drain electrode of the second field effect transistor 66, and the source electrode of the second field effect transistor 66 is connected to the neutral wire. The implementation principle of Embodiment 6 in FIG. 8 is similar to that in FIG. 6, and is not repeated herein.

Figure 9:
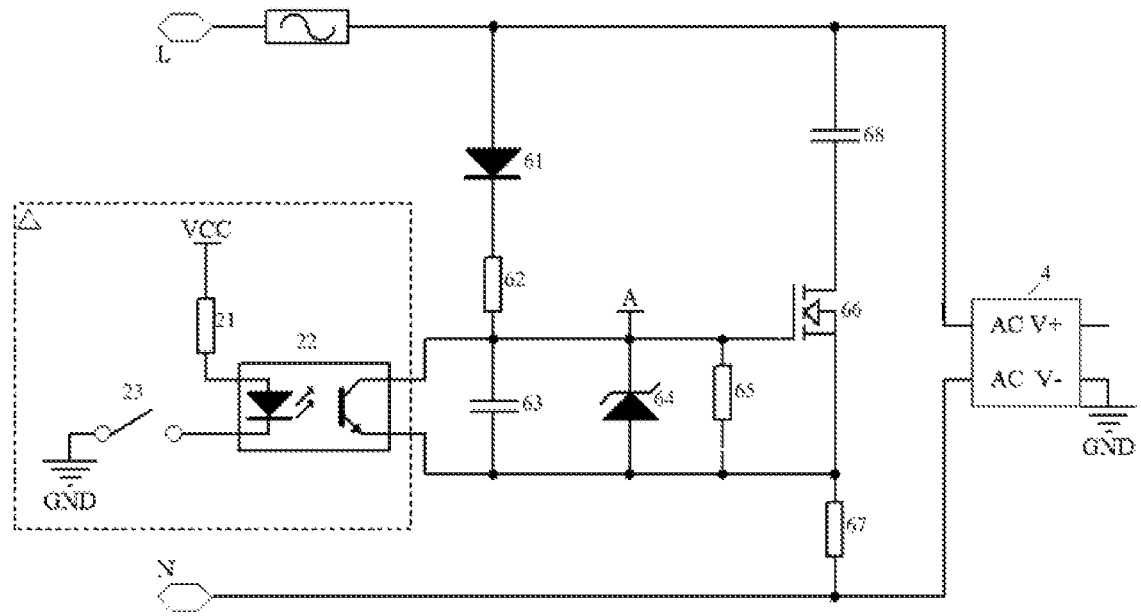
FIG. 9 illustrates a circuit structural schematic view of a rectifier circuit consistent with Embodiment 7.

FIG. 9 illustrates a structural schematic view of a rectifier circuit consistent with Embodiment 7. As shown in FIG. 9, in the disclosed before-bridge damper circuit, the drain electrode of the second field effect transistor 66 is connected to the live wire via the fourth capacitor 68, and the source electrode of the second field effect transistor 66 is connected to the neutral wire via the seventh resistor 67. The implementation principle of Embodiment 7 in FIG. 9 is similar to that in FIG. 6, and is not repeated herein.

Figure 10:
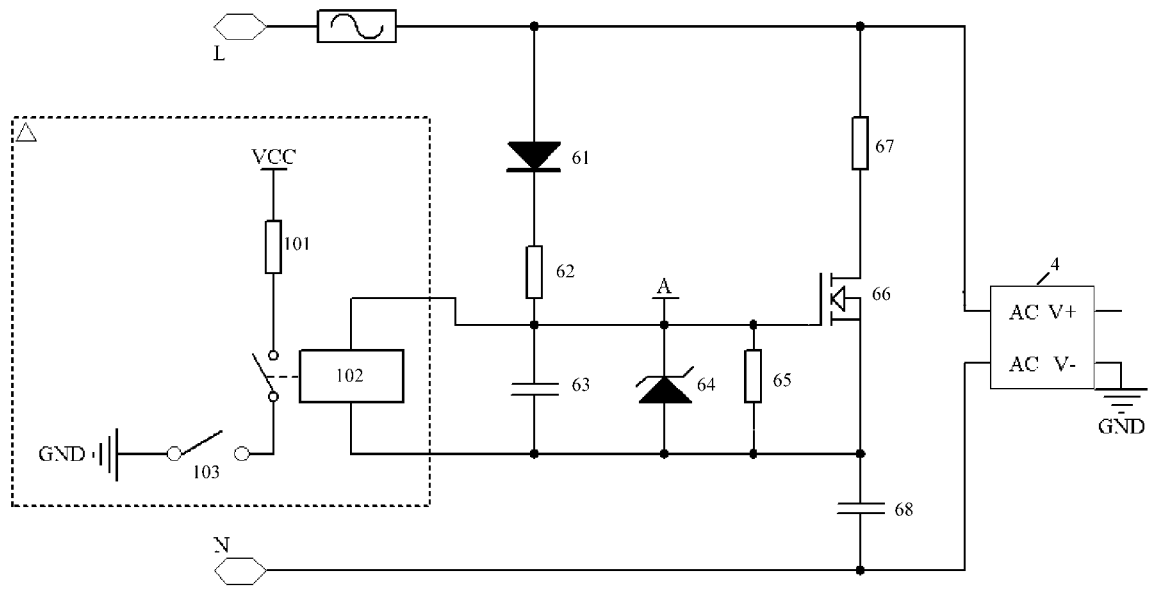
FIG. 10 illustrates a circuit structural schematic view of a rectifier circuit consistent with Embodiment 8.

FIG. 10 illustrates a circuit structural schematic view of a rectifier circuit consistent with Embodiment 8. As shown in FIG. 10, input ends of the rectifier bridge 4 are connected to the live wire and the neutral wire carrying the alternating current, where L denotes the live wire and N denotes the neutral wire. The live wire is connected to the input end of the rectifier bridge 4 via a fuse. The second driver circuit comprises: an eighth resistor 101 and a second switch 103. The isolator comprises: a relay 102. An output end of a primary side of the relay 102 is connected to ground via the second switch 103, an input end of the primary side of the relay 102 is connected to a power source via the eighth resistor 101, and an input end and an output end of the secondary side of the relay 102 are connected to two sides of the third capacitor 63, respectively.

More specifically, the second switch 103 is switched on or off based on the after-bridge control signal. When the second switch 103 is switched on, the primary side of the relay 102 is conducting, and the secondary side of the relay 102 is conducting. Thus, the voltage level at point A is lowered, the second field effect transistor 66 is turned off, and thus the seventh resistor 67 is disconnected with the fourth capacitor 68. When the second switch 103 is switched off, the primary side of the relay 102 is open, and the secondary side of the relay 102 is open, such that the voltage level at point A increases. When the voltage level at point A gradually increases to reach the voltage level of the second Zener tube 64, the second field effect transistor 66 is turned on, and thus the seventh resistor 67 and the fourth capacitor 68 are coupled to the circuit.

Figure 11:
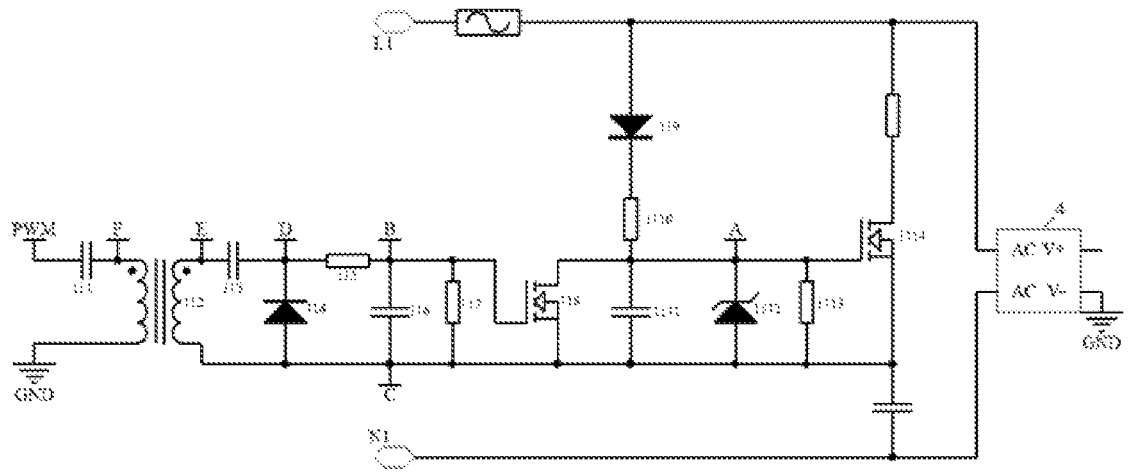
FIG. 11 illustrates a circuit structural schematic view of a rectifier circuit consistent with Embodiment 9.

FIG. 11 illustrates a circuit structural schematic view of a rectifier circuit consistent with Embodiment 9. As shown in FIG. 11, input ends of the rectifier bridge 4 are connected to the live wire and the neutral wire carrying the alternating current, where L denotes the live wire and N denotes the neutral wire. The live wire is connected to the input end of the rectifier bridge 4 via a fuse. In the disclosed rectifier circuit, the isolating driver circuit 1 comprises: a fifth capacitor 111, a transformer 112, a sixth capacitor 113, a third diode 114, a ninth resistor 115, a seventh capacitor 116, a tenth resistor 117, and a third field effect transistor 118.

An input end of a primary coil of the transformer 112 receives a signal via the fifth capacitor 111, and an output end of the primary coil of the transformer 112 is connected to ground. An input end of a secondary coil of the transformer 112 is respectively connected to a negative electrode of the third diode 114 and an end of the ninth resistor 115 via the sixth capacitor 113, and another end of the ninth resistor 115 is respectively connected to an end of the seventh capacitor 116, an end of the tenth resistor 117, and a gate electrode of the third field effect transistor 118. An output end of the secondary coil of the transformer 112 is respectively connected to the positive electrode of the third diode 114, another end of the seventh capacitor 116, another end of the tenth resistor 117, and the source electrode of the third field effect transistor 118. The drain electrode and the source electrode of the third field effect transistor 118 are connected to the switching control circuit 2.

The first driver circuit comprises: a fourth diode 119, an eleventh resistor 1110, an eighth capacitor 1111, a third Zener diode 1112, and a twelfth resistor 1113. The switching tube comprises: a fourth field effect transistor 1114.

A positive electrode of the fourth diode 119 is connected to the live wire, a negative electrode of the fourth diode 119 is connected to an end of the eleventh resistor 1110, another end of the eleventh resistor 1110 is respectively connected to the drain electrode of the third field effect transistor 118, an end of the eighth capacitor 1111, a negative electrode of the third Zener diode 1112, an end of the twelfth resistor 1113, and a gate electrode of the fourth field effect transistor 1114. A source electrode of the third field effect transistor 118 is respectively connected to another end of the eighth capacitor 1111, a positive electrode of the third Zener diode 1112, another end of the twelfth resistor 1113, and a source electrode of the fourth field effect transistor 1114. The drain electrode and the source electrode of the fourth field effect transistor 1114 are connected to the before-bridge damper circuit 3.

Figure 12:
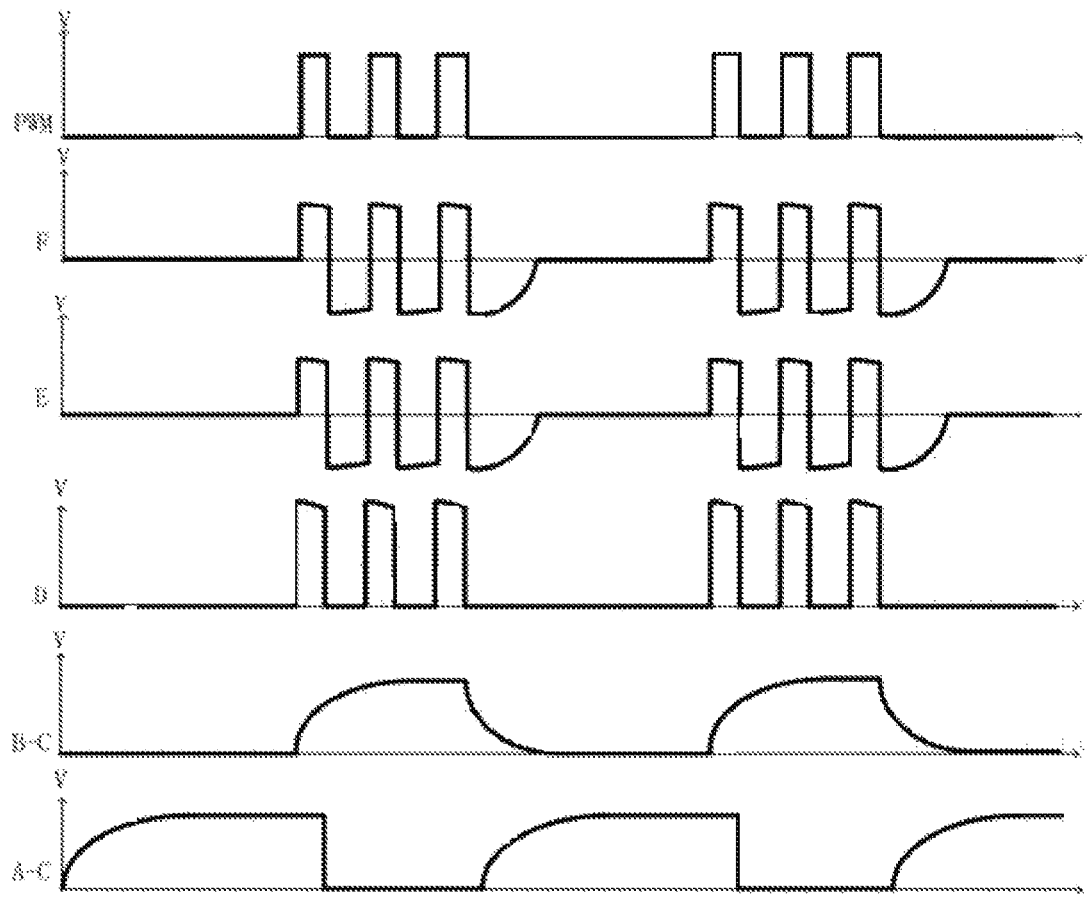
FIG. 12 illustrates a circuit principle diagram of a rectifier circuit consistent with Embodiment 9.

More specifically, FIG. 12 illustrates a circuit principle diagram of a rectifier circuit consistent with Embodiment 9. As shown in FIG. 12, when the PWM signal generates a negative semi-cycle oscillation signal at point F, point E senses the corresponding signal. After being processed by the sixth capacitor 113 and the third diode 114, the waveform at point D converts to positive semi-cycle waveform. Further, after being filtered by the ninth resistor 115 and the seventh capacitor 116, the signal at point B turns out to have DC voltage level and is used as a driving signal of the third field effect transistor 118. The voltage between point B and point C is illustrated in FIG. 12. When the voltage between point B and point C has a high voltage level, the voltage level between point A and point C has a low voltage level, and the before-bridge damper circuit is disconnected. When the PWM signal is zero, the voltage between point E and point C, and the voltage between point D and point C are also zero. After the tenth resistor 117 discharges, the voltage level between point B and point C becomes zero. When the voltage between point B and point C has a low voltage level and the voltage between point A and point C has a high voltage level, the before-bridge damper circuit is connected.

Figure 13:
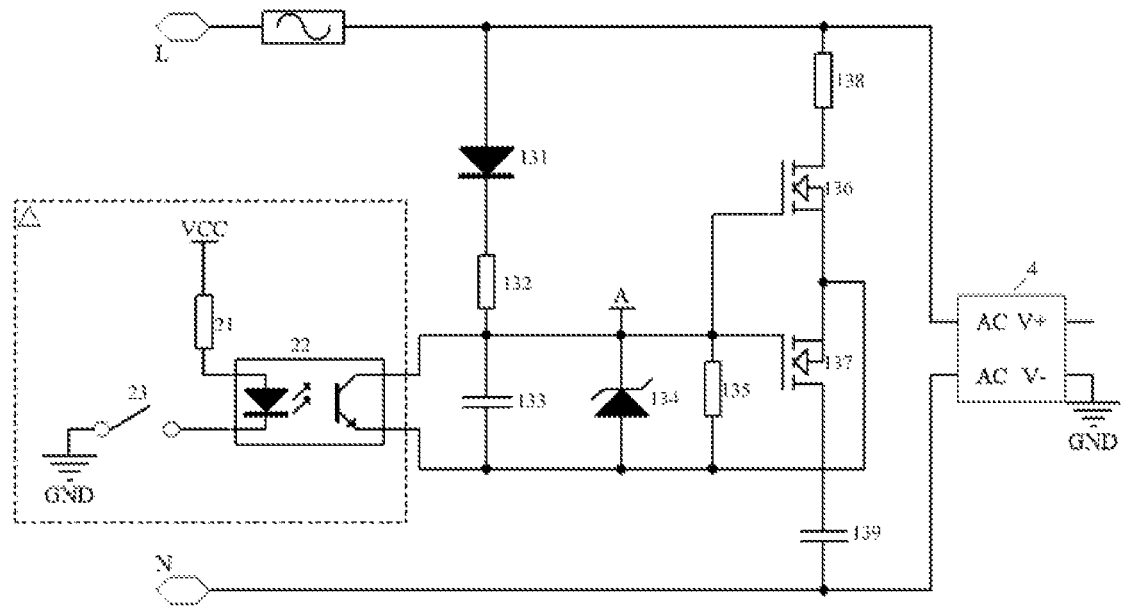
FIG. 13 illustrates a circuit structural schematic view of a rectifier circuit consistent with Embodiment 10.

FIG. 13 illustrates a circuit structural schematic view of a rectifier circuit consistent with Embodiment 10. As shown in FIG. 13, input ends of the rectifier bridge 4 are connected to the live wire and the neutral wire carrying the alternating current, where L denotes the live wire and N denotes the neutral wire. Further, the live wire is connected to an input end of the rectifier bridge 4 via a fuse. In the disclosed rectifier circuit, the first driver circuit comprises: a fifth diode 131, a thirteenth resistor 132, a ninth capacitor 133, a fourth Zener diode 134, a fourteenth resistor 135, and a fifth field effect transistor 136. The switching tube comprises: a sixth field effect transistor 137. The before-bridge damper circuit comprises: a fifteenth resistor 138 and a tenth capacitor 139.

A positive electrode of the fifth diode 131 is connected to the live wire, a negative electrode of the fifth diode 131 is connected to an end of the thirteenth resistor 132, and another end of the thirteenth resistor 132 is respectively connected to the secondary input end of the first photoelectric coupler 22, an end of the ninth capacitor 133, a negative electrode of the fourth Zener diode 134, an end of the fourteenth resistor 135, a gate electrode of the fifth field effect transistor 136, and a gate electrode of the sixth field effect transistor 137. The secondary output end of the first photoelectric coupler 22 is respectively connected to another end of the ninth capacitor 133, a positive electrode of the fourth Zener diode 134, another end of the fourteenth resistor 135, a source electrode of the fifth field effect transistor 136, and a source electrode of the sixth field effect transistor 137. The source electrode of the fifth field effect transistor 136 is connected to the source electrode of the sixth field effect transistor 137, a drain electrode of the fifth field effect transistor 136 is connected to the live wire via the fifteenth resistor 138, and the drain electrode of the sixth field effect transistor 137 is connected to the neutral wire via the tenth capacitor 139.

More specifically, in the embodiment, a control mode of two field effect transistors is used. The first switch 23 is switched on or off based on the after-bridge control signal. When the first switch 23 is switched on, the primary input end and the primary output end of the first photoelectric coupler 22 are connected, the secondary input end and the secondary output end of the first photoelectric coupler 22 are connected, and the voltage level at point A is lowered. Thus, the fifth field effect transistor 136 and the sixth field effect transistor 137 are both turned off, and the fifteenth resistance 138 and the tenth capacitor 139 are disconnected. When the first switch 23 is switched off, the primary input end and the primary output end of the first photoelectric coupler 22 are disconnected, and the secondary input end and the secondary output end of the first photoelectric coupler 22 are disconnected. After the voltage level at point A increases to reach the voltage level of the fourth Zener diode 134, the fifth field effect transistor 136 and the sixth field effect transistor 137 are both turned on, and the fifteenth resistor 138 and the tenth capacitor 139 are coupled to the circuit.

Figure 14:
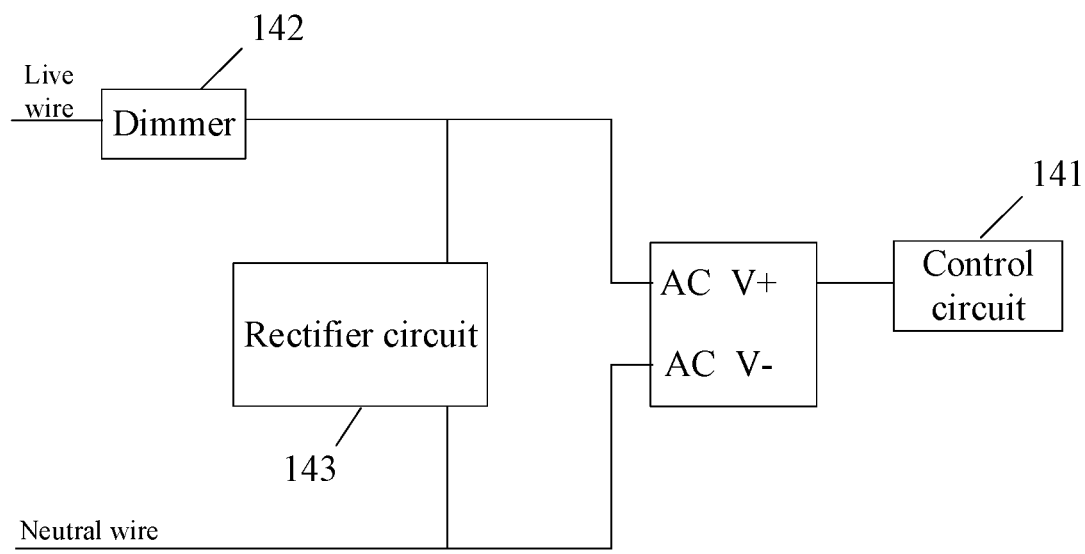
FIG. 14 illustrates a circuit structural schematic view of a dimmer circuit consistent with Embodiment 1.
Figure 15:
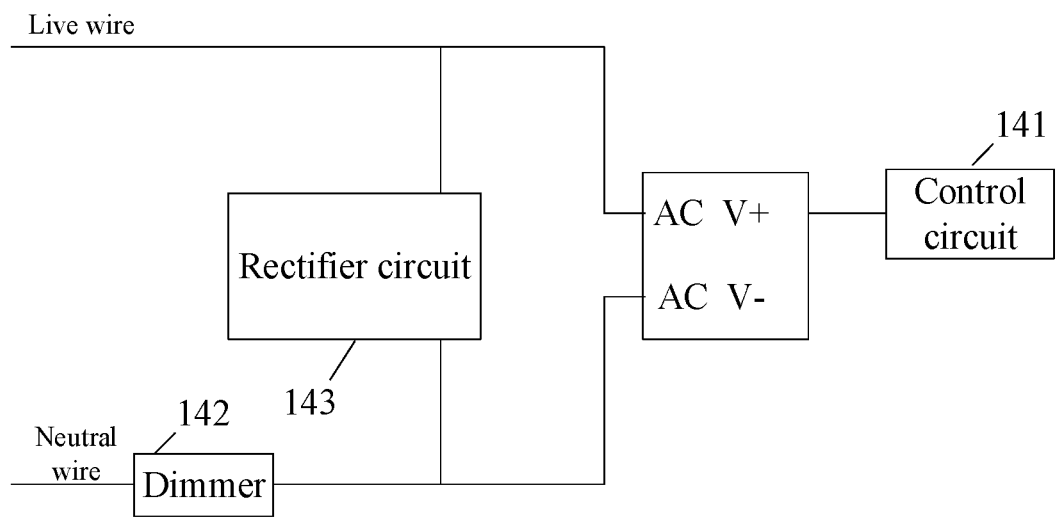
FIG. 15 illustrates a circuit structural schematic view of a dimmer circuit consistent with Embodiment 2.

FIG. 14 illustrates a structural schematic view of a dimmer circuit consistent with Embodiment 1. FIG. 15 illustrates a structural schematic view of a dimmer circuit consistent with Embodiment 2. As shown in FIG. 14 and FIG. 15, the disclosed dimmer circuit comprises: a control circuit 141, a dimmer 142, and a rectifier circuit 143 according to one of aforementioned embodiments. The dimmer 142 is connected in series with the input-end loop of the rectifier bridge. The control circuit 141 is connected after the rectifier bridge, and is configured to provide the after-bridge control signal to the rectifier circuit 143. The dimmer 142 in FIG. 14 is connected in series with the live wire at the input end of the rectifier bridge, and the dimmer 142 in FIG. 15 is connected in series with the neutral wire at the input end of the rectifier bridge.

More specifically, in the embodiment, the dimmer circuit applies the rectifier circuit described in the aforementioned embodiments. Based on the type of the coupled dimmer, the connection and disconnection of the before-bridge damper circuit is controlled flexibly, such that the normal operation of the dimmer device is ensured and the dimmer effect is also guaranteed.

Finally it should be illustrated that, the above-described embodiments are used to illustrate technical solutions of the present disclosure, but not to limit the present disclosure. Though the present disclosure is illustrated in detail with reference to the aforementioned embodiments, those ordinarily skilled in the art may understand that technical solutions in the present disclosure may still be modified, or partial or entire technical characteristics may be equivalently replaced. Such modification or replacement, without departing from the spirit of the present disclosure, shall all fall within the scope of the present disclosure.

What is claimed is:

1. A rectifier circuit, comprising:
an isolating driver circuit, a switching control circuit, a before-bridge damper circuit, and a rectifier bridge,
wherein the isolating driver circuit is connected to the before-bridge damper circuit via the switching control circuit, two ends of the switching control circuit are connected to two input ends of the rectifier bridge, respectively, and two ends of the before-bridge damper circuit are connected to the two input ends of the rectifier bridge, respectively, and
the isolating driver circuit is configured to receive an after-bridge control signal after the rectifier bridge, and the switching control circuit is configured to control the before-bridge damper circuit to disconnect or connect with the rectifier circuit based on the after-bridge control signal.

2. The circuit according to claim 1, wherein:
the switching control circuit comprises: a first driver circuit and a switching tube; and
the first driver circuit is configured to control the switching tube based on the after-bridge control signal, and the switching tube is configured to control the before-bridge damper circuit to disconnect or connect with the rectifier circuit.

3. The circuit according to claim 2, wherein:
the before-bridge damper circuit is a first order resistance-capacitance (RC) series circuit; and
the before-bridge damper circuit is connected in series with the switching tube.

4. The circuit according to claim 3, wherein:
the isolating driver circuit comprises: a second driver circuit and an isolator;
the second driver circuit is configured to receive the after-bridge control signal after the rectifier bridge, and the isolator is configured to realize electric isolation between the isolating driver circuit and the switching control circuit; and the two input ends of the rectifier bridge are respectively connected to a live wire and a neutral wire that carry an alternating current.

5. The circuit according to claim 4, wherein:
the second driver circuit comprises: a first resistor and a first switch; and
the isolator comprises: a first photoelectric coupler,
wherein a primary input end of the first photoelectric coupler is connected to a power source via the first resistor, a primary output end of the first photoelectric coupler is connected to ground via the first switch, and a secondary output end and a secondary input end of the first photoelectric coupler are both connected to the switching control circuit.

6. The circuit according to claim 5, wherein:
the first driver circuit comprises: a first diode, a second resistor, a first capacitor, a first Zener diode, and a third resistor; and
the switching tube comprises: a first field effect transistor,
wherein a positive electrode of the first diode is connected to the live wire,
a negative electrode of the first diode is connected to an end of the second resistor,
another end of the second resistor is connected to an end of the first capacitor, a negative end of the first Zener diode, and the secondary input end of the first photoelectric coupler, respectively,
another end of the first capacitor is connected to a positive end of the first Zener diode, an end of the third resistor, and a source electrode of the first field effect transistor,
another end of the third resistor is connected to the secondary output end of the first photoelectric coupler and a gate electrode of the first field effect transistor, and
a drain electrode and the source electrode of the first field effect transistor are connected to the before-bridge damper circuit, respectively.

7. The circuit according to claim 6, wherein:
the before-bridge damper circuit comprises: a fourth resistor and a second capacitor.

8. The circuit according to claim 7, wherein:
the drain electrode of the first field effect transistor is connected to the live wire via the fourth resistor, and the source electrode of the first field effect transistor is connected to the neutral wire via the second capacitor.

9. The circuit according to claim 7, wherein:
an end of the second capacitor is connected to the live wire via the fourth resistor, another end of the second capacitor is connected to the drain electrode of the first field effect transistor, and the source electrode of the first field effect transistor is connected to the neutral wire.

10. The circuit according to claim 7, wherein:
the drain electrode of the first field effect transistor is connected to the live wire via the second capacitor, and the source electrode of the first field effect transistor is connected to the neutral wire via the fourth resistor.

11. The circuit according to claim 4, wherein:
the first driver circuit comprises: a second diode, a fifth resistor, a third capacitor, a second Zener diode, and a sixth resistor; and
the switching tube comprises: a second field effect transistor;
wherein a positive electrode of the second diode is connected to the live wire,
a negative electrode of the second diode is connected to an end of the fifth resistor,
another end of the fifth resistor is connected to the isolating driver circuit, an end of the third capacitor, a negative electrode of the second Zener diode, an end of the sixth resistor, and a gate electrode of the second field effect transistor, respectively,
the isolating driver circuit is connected to another end of the third capacitor, a positive electrode of the second Zener diode, another end of the sixth resistor, and a source electrode of the second field effect transistor, respectively, and
a drain electrode and the source electrode of the second field effect transistor are connected to the before-bridge damper circuit.

12. The circuit according to claim 11, wherein:
the before-bridge damper circuit includes: a seventh resistor and a fourth capacitor.

13. The circuit according to claim 12, wherein:
the drain electrode of the second field effect transistor is connected to the live wire via the seventh resistor, and the source electrode of the second field effect transistor is connected to the neutral wire via the fourth capacitor.

14. The circuit according to claim 12, wherein:
an end of the fourth capacitor is connected to the live wire via the seventh resistor, another end of the fourth capacitor is connected to the drain electrode of the second filed effect tube, and the source electrode of the second field effect transistor is connected to the neutral wire.

15. The circuit according to claim 12, wherein:
the drain electrode of the second field effect transistor is connected to the live wire via the fourth capacitor, and the source electrode of the second field effect transistor is connected to the neutral wire via the seventh resistor.

16. The circuit according to claim 4, wherein:
the second driver circuit comprises: an eighth resistor and a second switch; and
the isolator comprises a relay,
wherein an output end of a primary side of the relay is connected to ground via the second switch, and an input end of the primary side of the relay is connected to a power source via the eighth resistor, and
an input end and an output end of a secondary side of the relay are connected to two sides of a third capacitor, respectively.

17. The circuit according to claim 3, wherein:
the isolating driver circuit comprises: a fifth capacitor, a transformer, a sixth capacitor, a third diode, a ninth resistor, a seventh capacitor, a tenth resistor, and a third field effect transistor,
wherein an input end of a primary coil of the transformer receives a signal via the fifth capacitor,
an output end of the primary coil of the transformer is connected to ground,
an input end of a secondary coil of the transformer is respectively connected to a negative electrode of the third diode and an end of the ninth resistor via the sixth capacitor,
another end of the ninth resistor is connected to an end of the seventh capacitor, an end of the tenth resistor, and a gate electrode of the third field effect transistor,
an output end of the secondary coil of the transformer is respectively connected to a positive electrode of the third diode, another end of the seventh capacitor, another end of the tenth resistor, and a source electrode of the third field effect transistor, and a drain electrode and the source electrode of the third field effect transistor are connected to the switching control circuit; and the switching control circuit comprises: a fourth diode, an eleventh resistor, an eighth capacitor, a third Zener diode, a twelfth resistor, and a fourth field effect transistor, wherein a positive electrode of the fourth diode is connected to the live wire, a negative electrode of the fourth diode is connected to an end of the eleventh resistor, another end of the eleventh resistor is respectively connected to a drain electrode of the third field effect transistor, an end of the eighth capacitor, a negative electrode of the third Zener diode, an end of the twelfth resistor, and a gate electrode of the fourth field effect transistor, a source electrode of the third field effect transistor is respectively connected to another end of the eighth capacitor, a positive electrode of the third Zener diode, another end of the twelfth resistor, and a source electrode of the fourth field effect transistor, and a drain electrode and the source electrode of the fourth field effect transistor are connected to the before-bridge damper circuit.

18. The circuit according to claim 5, wherein:

the first driver circuit comprises: a fifth diode, a thirteenth resistor, a ninth capacitor, a fourth Zener diode, a fourteenth resistor, and a fifth field effect transistor; and the switching tube comprises: a sixth field effect transistor, wherein a positive electrode of the fifth diode is connected to the live wire, a negative electrode of the fifth diode is connected to an end of the thirteenth resistor, another end of the thirteenth resistor is respectively connected to the secondary input end of the first photoelectric coupler, an end of the ninth capacitor, a negative electrode of the fourth Zener diode, an end of the fourteenth resistor, a gate electrode of the fifth field effect transistor, and a gate electrode of the sixth field effect transistor, the secondary output end of the first photoelectric coupler is respectively connected to another end of the ninth capacitor, a positive electrode of the fourth Zener diode, another end of the fourteenth resistor, a source electrode of the fifth field effect transistor, and a source electrode of the sixth field effect transistor, the source electrode of the fifth field effect transistor is connected to the source electrode of the sixth field effect transistor, the drain electrode of the fifth field effect transistor is connected to the live wire via the fifteenth resistor, and a drain electrode of the sixth field effect transistor is connected to the neutral wire via the tenth capacitor.

19. A dimmer circuit, comprising:

a control circuit, a dimmer, and a rectifier circuit;

wherein:

the rectifier circuit comprises:

an isolating driver circuit, a switching control circuit, a before-bridge damper circuit, and a rectifier bridge, wherein the isolating driver circuit is connected to the before-bridge damper circuit via the switching control circuit, two ends of the switching control circuit are connected to two input ends of the rectifier bridge, respectively, and two ends of the before-bridge damper circuit are connected to the two input ends of the rectifier bridge, respectively, and the isolating driver circuit is configured to receive an after-bridge control signal after the rectifier bridge, and the switching control circuit is configured to control the before-bridge damper circuit to disconnect or connect with the rectifier circuit based on the after-bridge control signal;

the dimmer is connected in series with an input-end loop of the rectifier bridge; and the control circuit is connected after the rectifier bridge, and is configured to provide the after-bridge control signal to the rectifier circuit.

* * * * *